(12) United States Patent
Crowther et al.

(10) Patent No.: US 10,254,957 B2
(45) Date of Patent: Apr. 9, 2019

(54) ACTIVATION TARGET DEFORMATION USING ACCELEROMETER OR GYROSCOPE INFORMATION

(71) Applicant: INTERNATIONAL BUSINESS MACHINES CORPORATION, Armonk, NY (US)

(72) Inventors: Fiona M. Crowther, Manchester (GB); Geza Geleji, Hursley Park (GB); Christopher J. Poole, Hursley Park (GB); Martin A. Ross, Hursley Park (GB); Craig H. Stirling, Hursley Park (GB)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 418 days.

(21) Appl. No.: 14/814,919

(22) Filed: Jul. 31, 2015

(65) Prior Publication Data

US 2016/0041755 A1 Feb. 11, 2016

(30) Foreign Application Priority Data

Aug. 7, 2014 (GB) .................................. 1413975.2

(51) Int. Cl.
*G06F 3/048* (2013.01)
*G06F 3/0488* (2013.01)
(Continued)

(52) U.S. Cl.
CPC ........ *G06F 3/04886* (2013.01); *G06F 3/0233* (2013.01); *G06F 3/04842* (2013.01); *G06F 3/0481* (2013.01); *G06F 3/0487* (2013.01)

(58) Field of Classification Search
None
See application file for complete search history.

(56) References Cited

U.S. PATENT DOCUMENTS 6,784,873 B1 8/2004 Boesen et al.
8,599,152 B1 3/2013 Wurtenberger et al.
(Continued)

FOREIGN PATENT DOCUMENTS

WO WO 20131032500 A1 3/2013

OTHER PUBLICATIONS

Nicolas Milani, Safety in Mobile Computing—Part 1, Jul./Aug. 2008, Policefleet Manager, Edition or vol. 6, 4; pp. 24-29 (Year: 2008).*

(Continued)

*Primary Examiner* — Tam T Tran
(74) *Attorney, Agent, or Firm* — Michael O'Keefe, Esq.; Kevin P. Radigan, Esq.; Heslin Rothenberg Farley & Mesiti P.C.

(57) ABSTRACT

A method is provided for deforming one or more touch screen activation targets associated with respective representations of items displayed on a display of a touch screen device. The method includes: displaying one or more representations corresponding to each of the one or more items displayed on a display of a touch screen device; providing, for each displayed representation, an activation target defining boundaries within which a touch input is processed as corresponding to selection of the corresponding item; receiving information indicating the orientation or movement of the touch screen device; and responsive to the received orientation or movement information, deforming the activation target of the item with respect to the representation of the item. The items may be a plurality of keys forming a virtual keyboard; and each of the representations may be one of the plurality of keys on the display of the touch screen device.

17 Claims, 8 Drawing Sheets

(51) Int. Cl.
*G06F 3/0484* (2013.01)
*G06F 3/023* (2006.01)
*G06F 3/0481* (2013.01)
*G06F 3/0487* (2013.01)

(56) References Cited

U.S. PATENT DOCUMENTS

| | | | |
|---|---|---|---|
| 9,244,604 B1* | 1/2016 | Lewbel | G06F 3/0488 |
| 2003/0234797 A1* | 12/2003 | Williams | G06F 1/1626 |
| | | | 345/649 |
| 2010/0302168 A1 | 12/2010 | Giancarlo et al. | |
| 2012/0032897 A1* | 2/2012 | Chen | G06F 3/0418 |
| | | | 345/173 |
| 2013/0002565 A1 | 1/2013 | Tumanov et al. | |
| 2013/0044063 A1 | 2/2013 | Kim | |
| 2014/0164973 A1* | 6/2014 | Greenzeiger | G06F 3/04886 |
| | | | 715/773 |
| 2015/0154773 A1* | 6/2015 | Cosenza | G01C 21/20 |
| | | | 345/619 |

OTHER PUBLICATIONS

Drew Robb, Eye Commander, Aug. 20, 2007, Computerworld, Edition or vol. 41, pp. 34-36 (Year: 2007).*

Anonymous, "A Method to Automatically Recognize Intended Touch Coordination Based on User's Posture", IP.com Prior Art Database Disclosure, Document ID: IPCOM000227734D, published May 14, 2013 (7 pages).

Anonymous, "HomeRow Keyboard—Invisible Keyboard for Tablets and Touch Screen Devices", IP.com Prior Art Database Disclosure, Document ID: IPCOM000230069D, published Aug. 16, 2013 (2 pages).

Search Report for GB Application No. GB141413975.2 (filed Aug. 7, 2014), dated Jan. 30, 2015 (3 pages).

* cited by examiner

ACTIVATION TARGET DEFORMATION USING ACCELEROMETER OR GYROSCOPE INFORMATION

PRIOR FOREIGN APPLICATION

This application claims priority from United Kingdom patent application number 1413975.2, filed Aug. 7, 2014, which is hereby incorporated herein by reference in its entirety.

BACKGROUND

The present invention relates to the deformation of activation targets associated with items displayed on touch screen devices using accelerometer or gyroscope information in such devices, and more particularly, to deforming keyboard activation targets using accelerometer or gyroscope information in such devices.

Touch screen devices such as smartphones and tablets are used in places and situations where laptops are not traditionally used. Since smartphones and tablets present small virtual keyboards on their display screen to the user for input, many techniques have been developed which help a user enter text with minimal mistakes.

Figure 1:
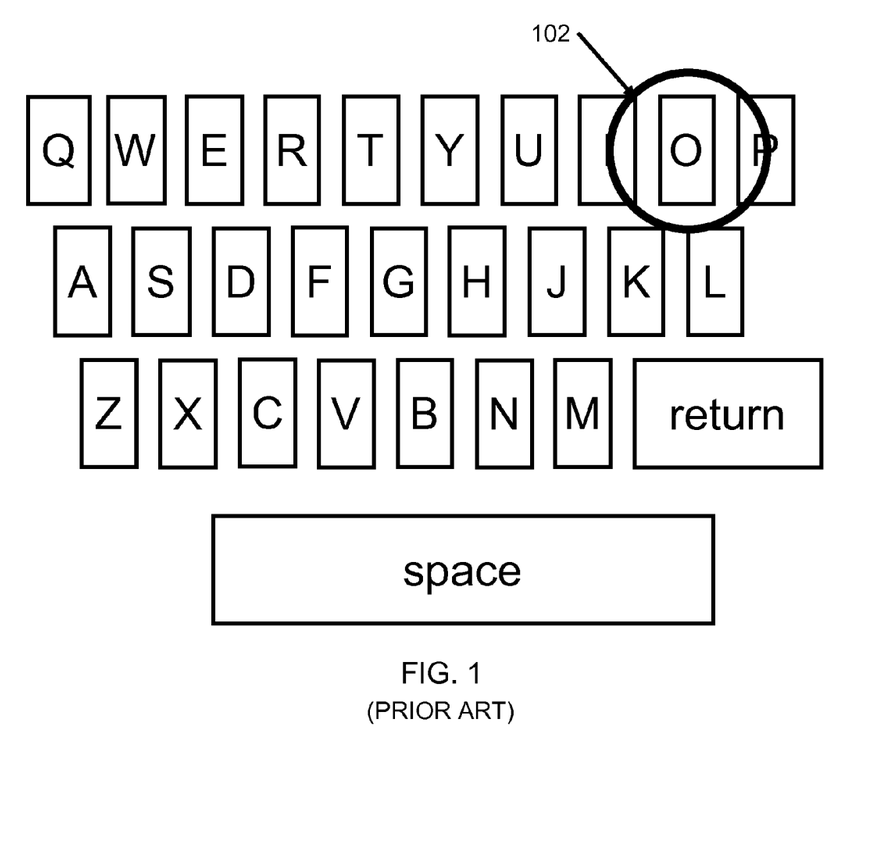
FIG. 1 shows a prior art example of one technique of extending an activation target for a particular key depending on which combination of keys have been typed previously.

FIG. 1 shows an example of one such technique, in which when a user taps keys on a virtual keyboard, the activation target for a particular key is extended beyond the pixel boundaries for the particular key being drawn on the display screen. For example, when typing "hello", after the user has typed "hell", the following letter is much more likely to be "o" than "p", and so the activation target 102 for the letter "o" is expanded, into the "p" key region. In the example of FIG. 1, only the activation target 102 changes, the keys displayed on the screen do not change in shape or size.

However, techniques such as that shown in FIG. 1 do not solve all the problems associated with helping a user enter text with minimal mistakes. As an example, when a user is using a virtual keyboard while lying on their side, the user tends to allow their thumbs when typing to be pulled down a little more than otherwise, towards the floor, thus applying a slight offset to the thumb placement on the keys. This leads to spelling mistakes and a poor user experience.

SUMMARY

In one or more aspects, a method is provided herein for deforming one or more touch screen activation targets associated with respective one or more representations of items displayed on a display of a touch screen device. The method includes, for instance: displaying one or more representations corresponding to each of the one or more items displayed on a display of a touch screen device; providing, for each displayed representation, an activation target defining boundaries within which a touch input is processed as corresponding to selection of the corresponding item; receiving information indicating the orientation or movement of the touch screen device; and responsive to the received orientation or movement information, deforming the activation target of the item with respect to the representation of the item.

In one or more other aspects, a system is provided herein for deforming one or more touch screen activation targets associated with respective one or more representations of items displayed on a display of a touch screen device. The system includes: a memory, and a processor in communications with the memory, wherein the system performs a method comprising: displaying one or more representations corresponding to each of the one or more displayed items on a display of a touch screen device; providing, for each displayed representation, an activation target defining boundaries within which a touch input is processed as corresponding to selection of the corresponding item; receiving information indicating the orientation or movement of the touch screen device; and responsive to the received orientation or movement information, deforming the activation target of the item with respect to the representation of the item.

In further aspects, a computer program product is provided herein for deforming one or more touch screen activation targets associated with respective one or more representations of items displayed on a display of a touch screen device. The computer program product includes a computer readable storage medium having computer readable program code embodied therein, the computer readable program code performing the following when run on a computer: displaying one or more representations corresponding to each of the one or more items displayed on a display of a touch screen device; providing, for each displayed representation, an activation target defining boundaries within which a touch input is processed as corresponding to selection of the corresponding item; receiving information indicating the orientation or movement of the touch screen device; and responsive to the received orientation or movement information, deforming the activation target of the item with respect to the representation of the item.

BRIEF DESCRIPTION OF THE DRAWINGS

Embodiments of the present invention are described below in detail, by way of example only, with reference to the accompanying drawings, in which.

DETAILED DESCRIPTION

Figure 2:
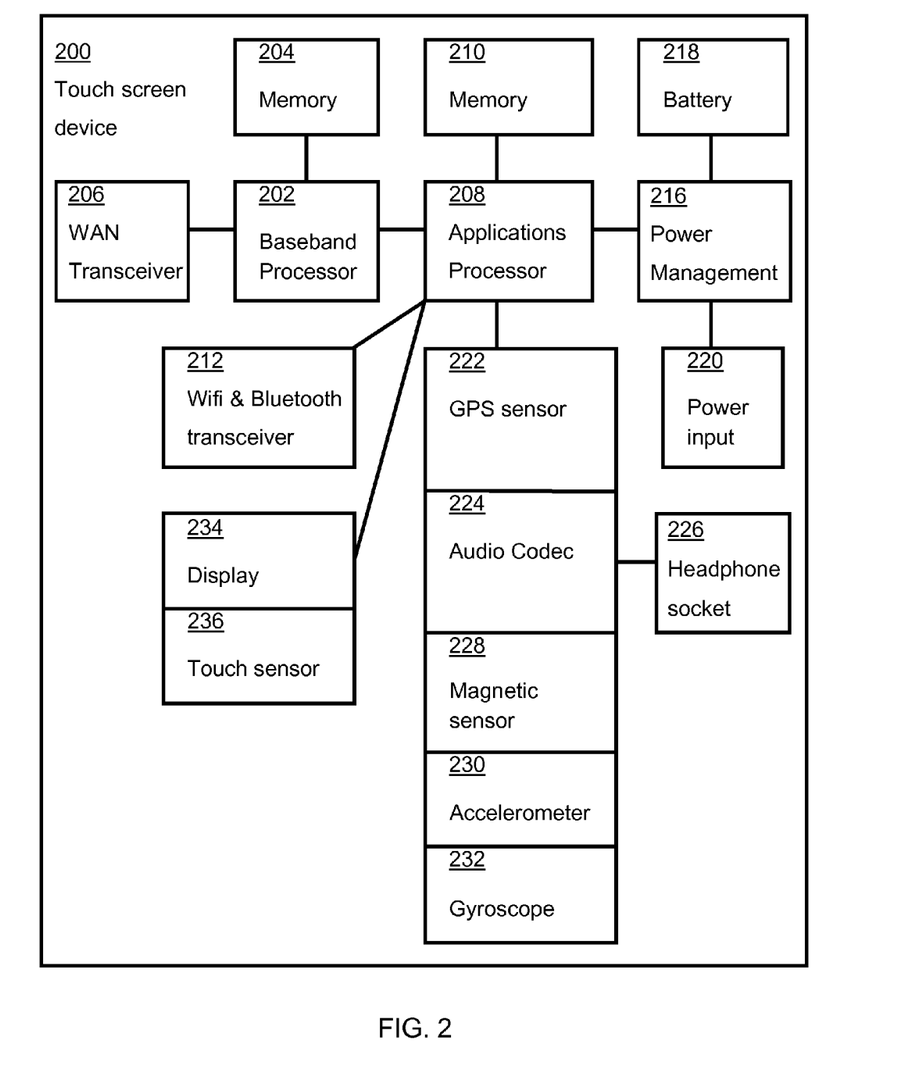
FIG. 2 shows a block diagram of a touch screen device in which aspects of the present invention may be implemented.

FIG. 2 shows a block diagram of a touch screen device 200 in which one or more aspects of the present invention may be implemented. Baseband processor 202 in a network interface manages the radio functions that require an antenna. In the example of FIG. 2, this is the Wide Area Network (WAN) transceiver 206 which provides communication with a WAN such as the internet. Baseband processor 202 is also connected to memory 204 and to applications processor 208. Applications processor 208 is a chip in the touch screen device 200 that can run an operating system and applications software. Applications processor 208 is connected to memory 210 for the storage of the operating system, applications software and data. Applications processor 208 is also connected to Wifi & Bluetooth® transceiver 212. In certain touch screen devices 200, Wifi & Bluetooth transceiver 212 may alternatively be connected to baseband processor 202. Applications processor 208 is also connected to power management 216 which manages the power from power input 220 and from battery 218 to supply power to the touch screen device 202 to operate and to the battery 218 to recharge it. Also connected to applications processor 208 are Global Positioning System (GPS) sensor 222 to provide geographical position information to applications processor 208 and audio codec 224 to receive audio data from applications processor 208 and output it to headphone socket 226 and to a loudspeaker (not shown). Applications processor 208 is further connected to magnetic sensor 228 which may provide input to allow the device to act as a compass. Particular touch screen devices 202 may not have all of the items described above such as, for example, Wifi & Bluetooth transceiver 212, GPS sensor 222 or magnetic sensor 228. An example of such an magnetic sensor is the AKM8975 available from AKM Semiconductor. Particular touch screen devices 200 may have additional items not described above, for example, external display or network connections.

Applications processor 208 is also connected to display 234 for displaying data to a user and touch sensor 236 for receiving touch input from a user. Applications processor 208 is further connected to accelerometer 230 and gyroscope 232. Accelerometer 230 allows the touch screen device 202 to detect its orientation and adapt the content shown on the display 234 to fit different orientations of the display. As a user rotates the touch screen device 202 from portrait to landscape mode, the accelerometer 230 detects this change and causes the touch screen device 200 operating system and software to respond by adjusting the content shown on the display 234 to match the new orientation. For example, a browser may automatically rotate and change to landscape mode to provide a wider space for web surfing with less horizontal scrolling. Similarly, when playing video in a touch screen device 200 a better full screen view may be obtained. An example of such an accelerometer is the LIS331DLH 3-axis accelerometer available from ST Micro.

Gyroscope 232 uses Earth's gravity to help determine orientation. Its design consists of a freely-rotating disk called a rotor, mounted onto a spinning axis in the center of a larger and more stable wheel. As the axis turns, the rotor remains stationary to indicate the central gravitational pull, and thus which way is "down". An example of such a gyroscope is the L3G4200D digital gyroscope available from ST Micro. Particular touch screen devices 200 may not have all of the items described above such as, for example, gyroscope 232. Particular touch screen devices 200 may have additional items not described above.

When a touch screen device 200 with a virtual keyboard is being operated sideways, such as in bed or on a sofa, a user typically types with an offset to the thumb placement on the keys displayed on the display 234 which may lead to spelling mistakes and a poor user experience. Embodiments of the present invention use the accelerometer 230 or gyroscope 232 in the touch screen device 200 to detect this sideways use, and adjust the keyboard activation targets to account for the offset to the thumb placement. Such adjustment is not visible to the user on the display 234. The visual appearance of the virtual keyboard or its constituent keys displayed on the display 234 is not changed. The adjustment of the keyboard activation targets to account for the offset to the thumb placement improves the user experience, by improving the performance of auto-correction systems in the touch screen device 200. Embodiments of the invention test and detect, by using the touch screen device 200 at certain angles and positions, the offset and statistically find an increase in correct word guesses when embodiments of the invention are used.

The offset to the thumb placement is reasonably consistent for a given operating position, typically, a user may intend to type the letter "a", but touches the display 234 at a location which the touch sensor 236 determines corresponds to the letter "s" or intends to type the letter "t", but touches the display 234 at a location which the touch sensor 236 determines corresponds to the letter "r".

Embodiments of the present invention may be used with representations of items on the display 234 of the touch screen device 200 other than keys on a virtual keyboard. For example, multiple icons for selections of applications to run may be displayed on the display 234. When the touch screen device 200 is being operated sideways, such as in bed or on a sofa, the user may have an offset to the thumb placement resulting in selection of the incorrect application to run. Similarly, within an application, the wrong option may be selected on buttons displayed to a user, or the wrong item selected from a list displayed to the user.

Embodiments of the invention are described herein with respect to an implementation of keys of a virtual keyboard displayed on the display 234 and selected using the touch sensor 236 with input from the accelerometer 230 or gyroscope 232. A person skilled in the art will be able to see that the details of the embodiments described apply equally to the display of items in a list or to buttons displayed for selection.

Figure 3:
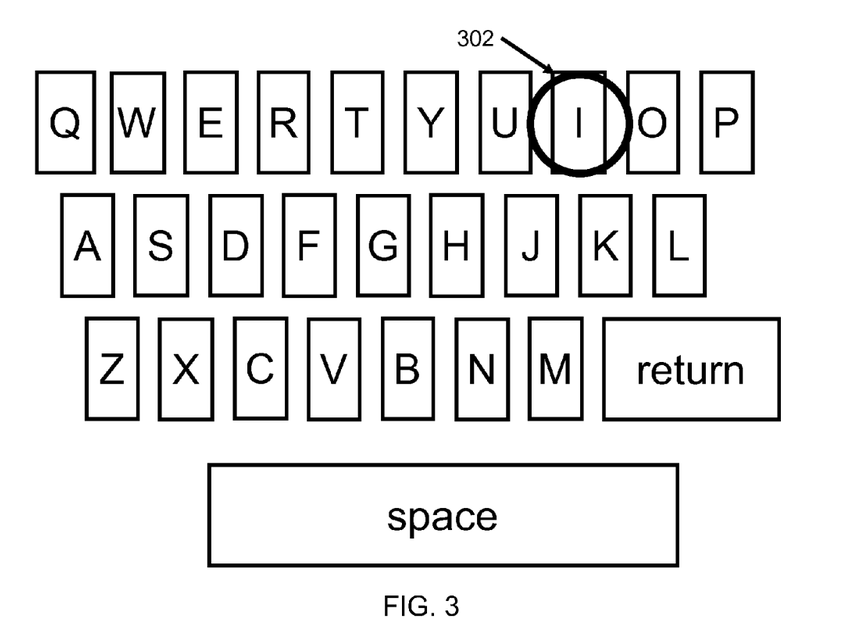
FIG. 3 shows an activation target overlaid on a virtual keyboard.

FIG. 3 shows an activation target 302 for the letter "i" overlaid on a prior art virtual keyboard. The activation target 302 is depicted as a circle centered on the letter "i".

Figure 4:
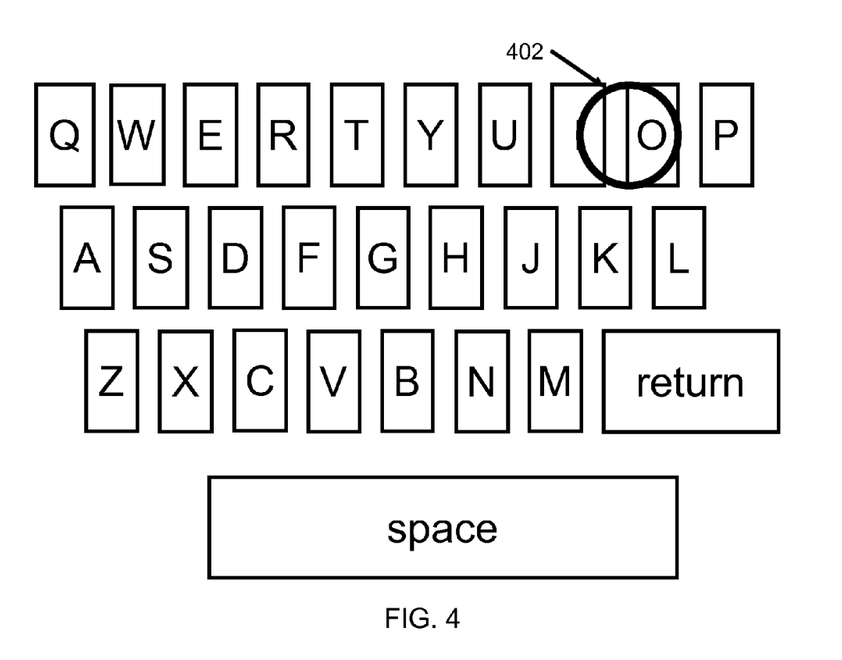
FIG. 4 shows an activation target according to an embodiment of the present invention shifted to the right when overlaid on a virtual keyboard.

FIG. 4 shows an activation target 402 according to an embodiment of the present invention overlaid on a virtual keyboard. If a user is laying on their right side, they are more likely to touch the display 234 towards the right side of the letter "i" displayed on the display 134. Activation target 402 for the letter "i" is accordingly moved to the right to correspond to where the user is most likely to touch the display 234 when typing the letter "i". Similarly, the activation target (not shown) for the letter "o" is also shifted to the right.

Figure 5:
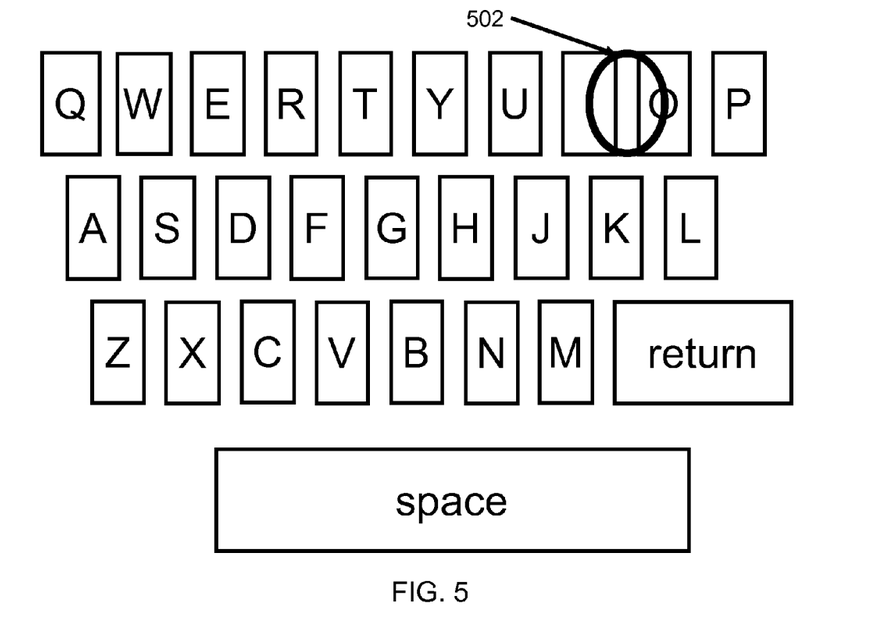
FIG. 5 shows an activation target according to an embodiment of the present invention shifted to the right and changed in shape from a circle to an ellipse when overlaid on a virtual keyboard.
Figure 6:
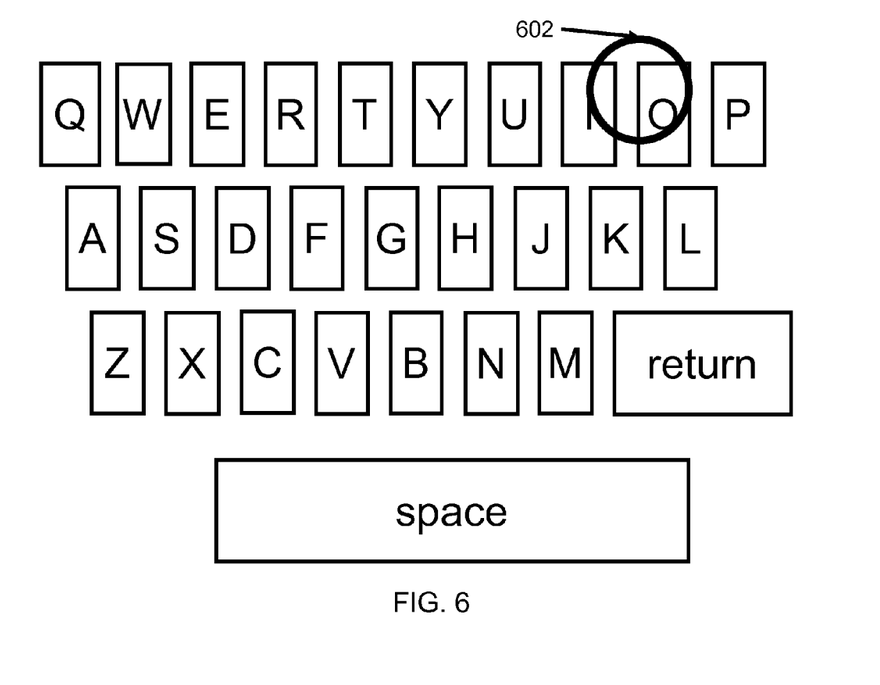
FIG. 6 shows an activation target according to an embodiment of the present invention shifted to the right and shifted upwards when overlaid on a virtual keyboard.
Figure 7:
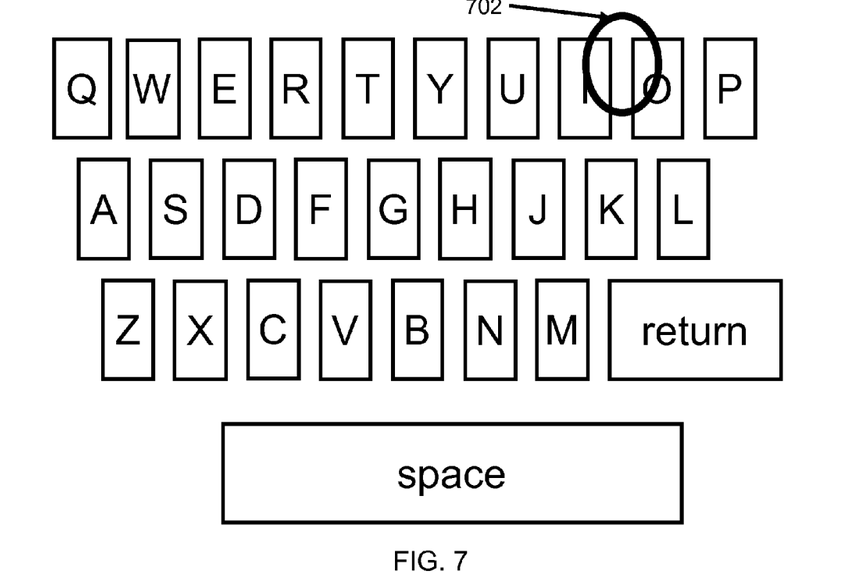
FIG. 7 shows an activation target according to an embodiment of the present invention shifted to the right, shifted upwards and changed in shape from a circle to an ellipse when overlaid on a virtual keyboard.
Figure 8:
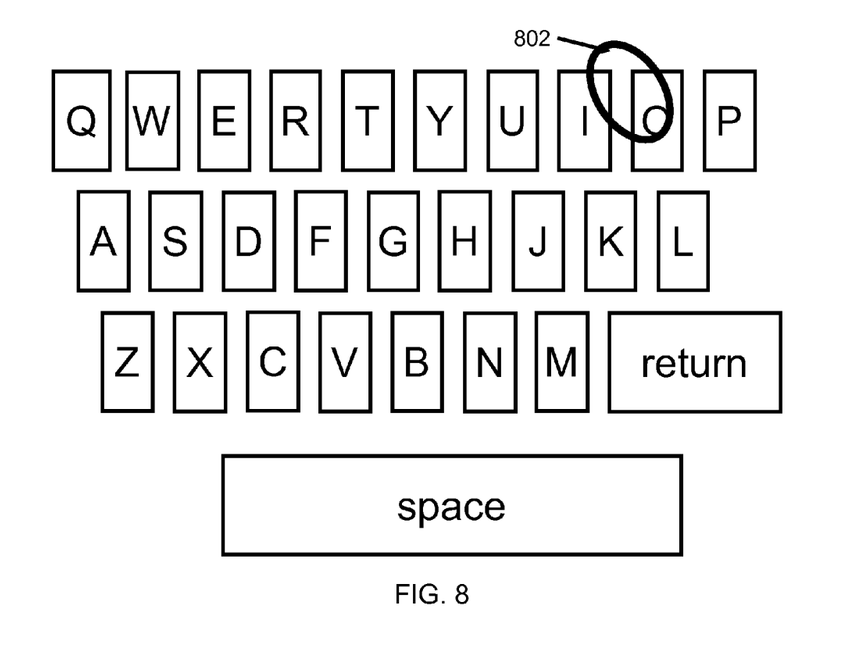
FIG. 8 shows an activation target according to an embodiment of the present invention shifted to the right, shifted upwards and changed in shape from a circle to an ellipse and rotated when overlaid on a virtual keyboard.

FIG. 5 shows a further example where the activation target 502 for the letter "i" is not only shifted to the right, but is also changed in shape from a circle to an ellipse. FIG. 6 shows a further example where the activation target 602 for the letter "i" is not only shifted to the right, but is also shifted slightly upwards. FIG. 7 shows a further example where the activation target 702 for the letter "i" is not only shifted to the right, but is also shifted slightly upwards and changed in shape from a circle to an ellipse. FIG. 8 shows a further example where the activation target 802 for the letter "i" is not only shifted to the right, shifted slightly upwards, changed in shape from a circle to an ellipse and rotated.

Figure 9:
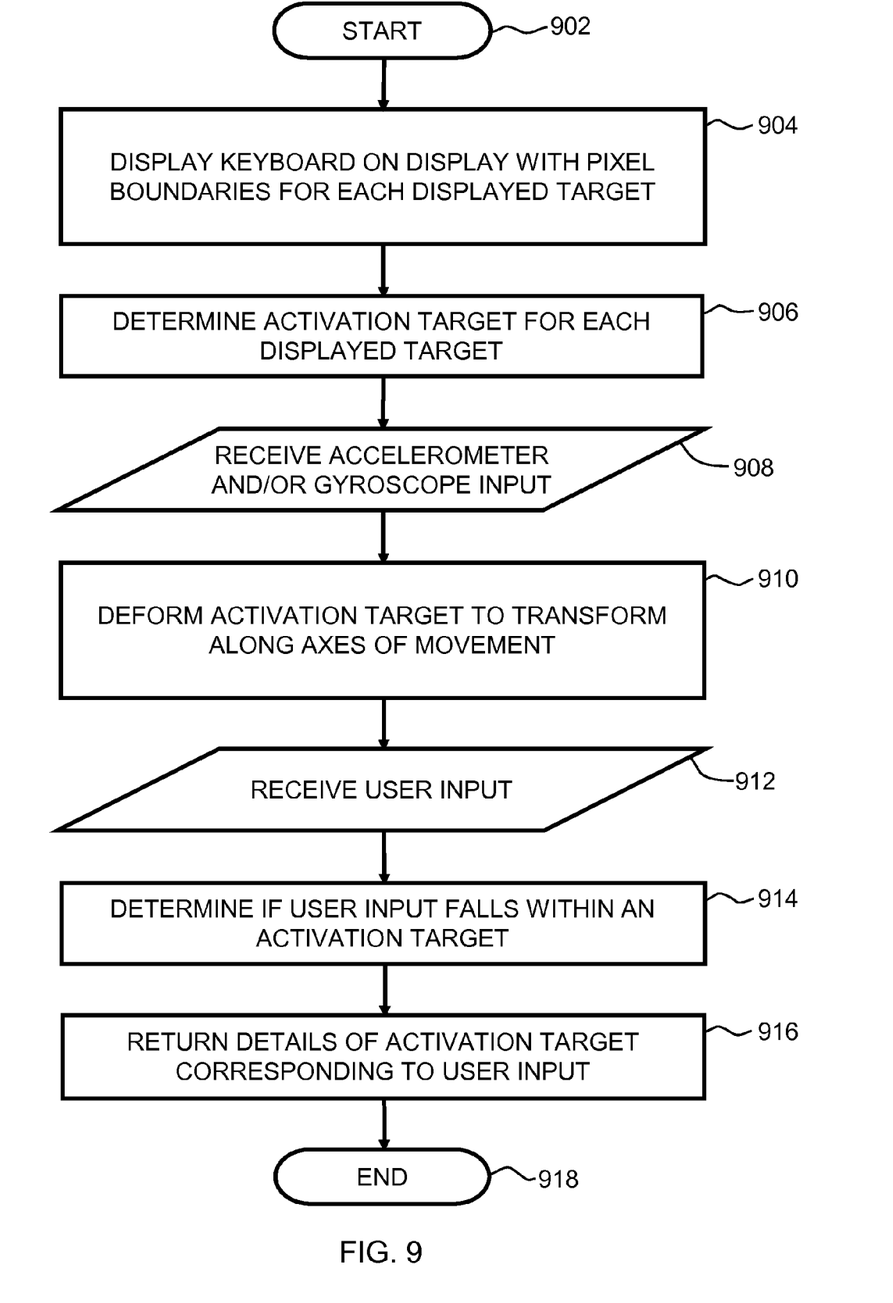
FIG. 9 shows a flow diagram of an embodiment of a method according to one or more aspects of the present invention for offsetting keyboard activation targets using accelerometer or gyroscope information.

Referring to FIG. 9, which shows a flow diagram of an embodiment of a method according to the present invention for offsetting keyboard activation targets using accelerometer 230 or gyroscope 232 information. The method starts at step 902. At step 904, a virtual keyboard is displayed on display screen 134. The virtual keyboard comprises constituent keys, such as those shown in FIGS. 1 and 3 to 8. Associated with each of the constituent keys are boundaries of the keys displayed on the display 234 to indicate to the user where the constituent keys are located. The area contained by the boundaries of a constituent key is the displayed target which a user selects by touching the display 234 and which is detected by the touch sensor 236. At step 906, an activation target is determined for each of the displayed targets. Typically, the activation target is slightly larger than the displayed target so as to allow for user inaccuracy in selecting a key by touching the constituent key within the displayed target. Also, typically, the activation targets do not overlap because this would lead to ambiguity as to which displayed target was selected by the user.

At step 908, accelerometer and/or gyroscope data is received from accelerometer 130 or gyroscope 132. The accelerometer and/or gyroscope data is used to determine the orientation and/or movement of the touch screen device 200. Either or both of the accelerometer or gyroscope data may be used. At step 910, the accelerometer or gyroscope data is used to adapt each of the activation targets using a transformation matrix to distort the size and/or shape of each of the activation targets. This is described further below with reference to FIGS. 10 to 12. Steps 904 to 910 may be performed at initialization, on request or as often as necessary during operation of the touch screen device 200.

At step 912, user input is received by a user touching a displayed target and the touch sensor 236 detecting where the user has touched the display 234. At step 914, the touch screen device 200 determines whether the user input falls within the associated activation target, that is the activation target that was deformed in step 910. At step 916, the details of which activation target corresponded to the user input is returned. The embodiment of the method according to the present invention ends at step 918.

In an embodiment, the method may restart from step 906 to determine activation targets for each displayed target, before receiving accelerometer and/or gyroscope input, deforming the activation targets and receiving user input. In another embodiment, the method may restart from step 908 to receive accelerometer and/or gyroscope input, before deforming the activation targets and receiving user input. In another embodiment, the method may restart from step 912 to receive user input using the previously deformed activation targets.

In an embodiment of the invention, the touch screen device 200 learns over time what the best offset value for the given user is, for example 0.3 mm, 0.4 mm or the like. The offset value may also be specified in pixels. Additionally, the offset value may include an angle of the offset. An example of learning over time is if the default offset is 0.2 mm in the direction the user is lying, but spelling mistakes still occur with keys to the right, the offset may be increased to 0.3 mm. As well as the size and angle of the offset, a change in shape of the activation, such as, for example, from a circle to an ellipse, may be learnt. Since displays 234 associated with touch screen devices 200 have such high Dots Per Inch (DPI) values, the offset correction may have a high degree of precision.

Additionally, for touch screen devices 200 that support multiple users, the offset and activation target shape may be defined for each user. For example, one user may typically require an offset of 0.2 mm at 90 degrees from the virtual key when the touch screen device 200 is held at an angle of y and z degrees to the user's orientation, allowing for the touch screen device 200 display 234 to not be facing the user completely straight on. Another user may need an offset of 0.4 mm at 85 degrees.

In further embodiments, the offset value may include different angles, values or shapes according to the time of day. In this embodiment, an offset value for the time of day when a user wakes up may correspond to the use of the touch screen device 200 at an angle while in bed, whilst an offset value for the evening may correspond with use of the touch screen device 200 on a sofa in the evening. In these embodiments, as in the embodiments described above, data from the accelerometer 230 and/or the gyroscope 232 can be used to determine orientation and apply that orientation information to determine the offset used.

In an embodiment, matrix transformations may be applied to deform the activation target as described above with reference to step 910 of FIG. 9. The activation target may be defined as a circle using a vector:

$$x = c + r1 \cos tu + r2 \sin tv$$

where t' [0; 2o], r1=r2 is the radius of the circle, c=(cx, cy) is a vector pointing at the center of the circle, and u=(ux, uy) and v=(vx, vy) are orthogonal unit vectors.

Figure 10:
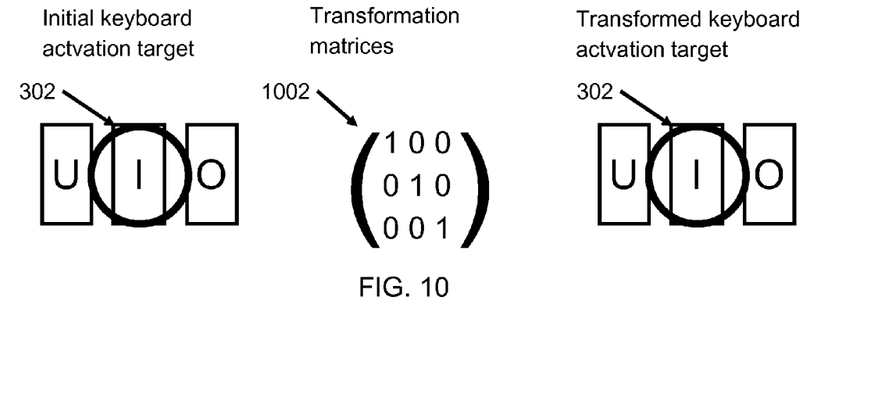
FIG. 10 shows an initial keyboard activation target with a unit matrix transformation applied to produce a transformed keyboard activation target corresponding to that of FIG. 3, in accordance with one or more aspects of the present invention.

A transformation matrix allows one circle to be deformed into another shape, such as an ellipse. The vector x above when multiplied by a unit matrix produces the vector x. This corresponds to the transformation described below with reference to FIG. 10.

$$\begin{pmatrix} 1 & 0 \\ 0 & 1 \end{pmatrix} x = x$$

Embodiments of the invention represent the activation target above a touch element as a certain shape (a circle in this instance), and apply a transformation matrix whose elements are derived from values returned from movement devices such as an accelerometer 230 or a gyroscope 232. In an embodiment, Tx=y (where T is the transformation matrix, x is the initial activation target and y is the deformed activation target).

$$T = \begin{pmatrix} t_1 & t_2 \\ t_3 & t_4 \end{pmatrix}$$

Scalar quantities ti are computed dynamically from input from accelerometer 230 or gyroscope 232 devices. The raw output from each device (for each axis x and y in the plane perpendicular to the device's screen), oi, is passed through a function such that:

$$ti = F(oi)$$

for a given value of i. In the simplest case, F simply passes the value through directly. In another embodiment, F can serve to damp the values, for example by averaging the last 10 inputs (if read at intervals of, for example, 0.1 seconds), to avoid excessive spikes and resultant rapid activation target shape changes.

Referring to FIG. 10, which shows an initial keyboard activation target 302 with a unit matrix transformation 1002 applied to produce a transformed keyboard activation target 302 corresponding to that of FIG. 3. The initial keyboard activation target 302 corresponds with the same-numbered target of FIG. 3. A unit matrix transformation 1002 is applied to the initial keyboard activation target 302. The unit matrix transformation 1002 is substantially the equivalent of the number '1', in that if a given matrix is multiplied by the unit matrix, the result is the given matrix. The transformed keyboard activation target 302 is identical to the same-numbered initial keyboard activation target 302.

Figure 11:
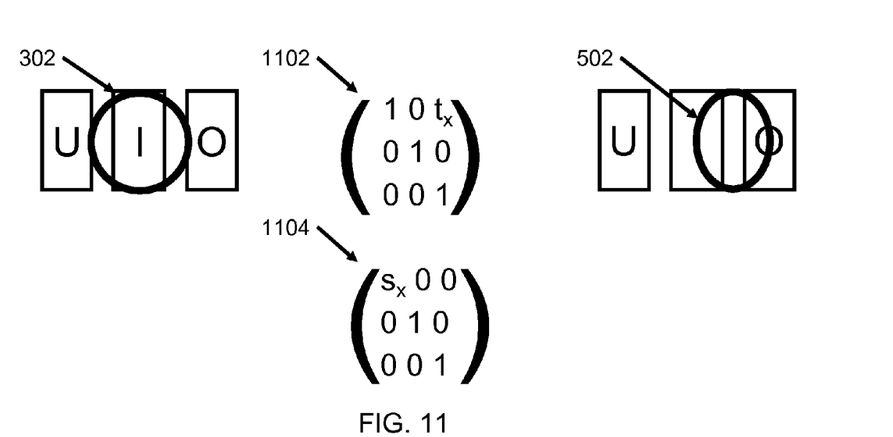
FIG. 11 shows an initial keyboard activation target with a translation matrix transformation applied to shift the target to the right and a scaling matrix transformation applied to change the shape from a circle to an ellipse to produce a transformed keyboard activation target corresponding to that of FIG. 5, in accordance with one or more aspects of the present invention.

Referring to FIG. 11, which shows an initial keyboard activation target 302 with a translation matrix transformation 1102 applied to shift the target to the right and a scaling matrix transformation 1104 applied to change the shape from a circle to an ellipse to produce a transformed keyboard activation target 502 corresponding to that of FIG. 5.

The initial keyboard activation target 302 corresponds with the same-numbered target of FIG. 3. A translation matrix transformation 1102 is applied to the initial keyboard activation target 302 to move it horizontally from being centered over the letter "i" displayed on the screen to being centered equidistant from the letter "i" displayed on the screen and the letter "o" displayed on the screen. The "tx" element of the translation matrix transformation 1102 is responsible for this translation in an x direction. A translation in a vertical direction may similarly be achieved by replacing the "0" element at the right hand side of the second row with a "ty" element. A "tx" element and a "ty" element may be used individually to produce a translation in an x direction or a y direction or may be used in combination to produce a translation in both an x direction and a y direction.

A scaling matrix transformation 1104 is then applied to the translated initial keyboard activation target 302 to change the shape of the keyboard activation target from a circle to an ellipse having a major axis positioned vertically along a y axis. The "sx" element of the scaling matrix transformation 1104 is responsible for this scaling in an x direction. A scaling in a vertical direction may similarly be achieved by replacing the "1" element at the center of the second row with a "sy" element. A "sx" element and a "sy" element may be used individually to produce a scaling in an x direction or a y direction or may be used in combination to produce a scaling in both an x direction and a y direction. The transformed keyboard activation target 502 is the initial keyboard activation target 302 translated in an x direction and scaled in an x direction only to produce the translated ellipse of the keyboard activation target are 502 of FIG. 5.

Figure 12:
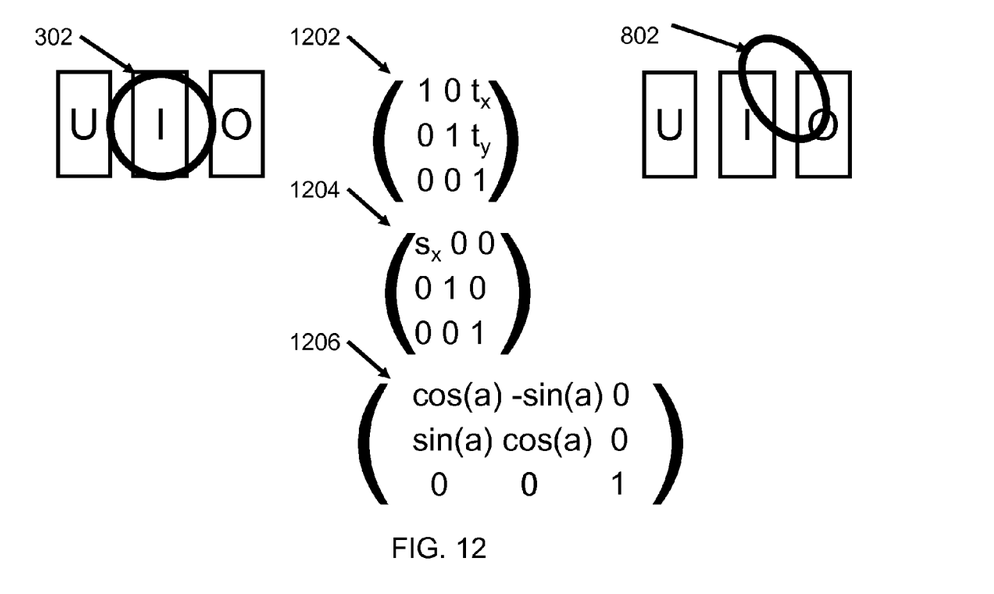
FIG. 12 shows an initial keyboard activation target with a translation matrix transformation applied to shift the target to the right and upwards, a scaling matrix transformation applied to change the shape from a circle to an ellipse and a rotation matrix transformation applied to rotate the ellipse to produce a transformed keyboard activation target corresponding to that of FIG. 8, in accordance with one or more aspects of the present invention.

Referring to FIG. 12, which shows an initial keyboard activation target 302 with a translation matrix transformation 1202 applied to shift the target to the right and upwards, a scaling matrix transformation 1204 applied to change the shape from a circle to an ellipse and a rotation matrix transformation 1206 applied to rotate the ellipse to produce a transformed keyboard activation target 802 corresponding to that of FIG. 8.

The initial keyboard activation target 302 corresponds with the same-numbered target of FIG. 3. A translation matrix transformation 1202 is applied to the initial keyboard activation target 302 to move it from being centered over the letter "i" displayed on the screen to being centered equidistant from the letter "i" displayed on the screen and the letter "o" displayed on the screen and at a point distance of about one quarter of the height of the letter "i" and the letter "o" displayed on the screen below the top of the letter "i" and the letter "o" displayed on the screen. The "tx" element of the translation matrix transformation 1202 is responsible for the translation in an x direction and the "ty" element of the translation matrix transformation 1202 is responsible for the translation in the y direction. The magnitude of the translation in the x direction may differ from the magnitude of the translation in the y direction. In the example of FIG. 12, the x direction translation is about 1.5 times the y direction translation, but other examples may have the translations in any combination.

A scaling matrix transformation 1204 is then applied to the translated initial keyboard activation target 302 to change the shape of the keyboard activation target from a circle to an ellipse. As described with reference to FIG. 11 above, the "sx" element of the scaling matrix transformation 1204 is responsible for this scaling in an x direction and a scaling in a vertical direction may similarly be achieved by replacing the "0" element at the center of the second row with a "sy" element. In the example of FIG. 12, the scaling produces an ellipse from a circle, but other examples may have the scalings in any combination.

A rotation matrix transformation 1206 is then applied to the translated, scaled initial keyboard activation target 302 to rotate the ellipse such that its major axis rotates from a vertical direction to an approximately north-west to south-east direction. The center of the ellipse remains unchanged. The angle through which the ellipse is rotated is represented by the value "a". "a" may be expressed in degrees, radians or any other unit of measurement of angles. In the example of FIG. 12, the angle is approximately minus 45 degrees or minus o/4 radians (the minus direction being counter-clockwise). The combination of the first two elements of the first row and the first two elements of the second row of the rotation matrix transformation 1206 are responsible for the rotation. Other angles and directions of rotation may be used with an appropriate value of "a". The transformed keyboard activation target 802 is the initial keyboard activation target 302 translated in an x direction and in a y direction, scaled in an x direction only and rotated to produce the translated ellipse of the keyboard activation target are 802 of FIG. 8.

Other transformations may also be used, such as a skew transformation in which a keyboard activation target is skewed by different angles with respect to each of the x axis (angle ax) and the y axis (angle ay). Such a transformation may be achieved by the use of a "tan(ax)" element in the centre of the first row and a "tan(ay)" element in the first element of the second row. A reflection transformation may be used, by simply applying a negative scale in either direction. These and the transformations described above may be combined in any way and in any number to produce the deformed activation targets described above with reference to step 910 of FIG. 9. The person skilled in the art will be able to see that the deformation of target areas may apply equally to the display of items in a list or to buttons displayed for selection or any other items displayed on a computer screen.

Those skilled in the art will note from the above description that provided herein in one or more aspects are methods for deforming one or more touch screen activation targets associated with respective one or more representations of items displayed on a display of a touch screen device. The methods include, for instance: displaying one or more representations corresponding to each of the one or more items displayed on a display of a touch screen device; providing, for each displayed representation, an activation target defining boundaries within which a touch input is processed as corresponding to selection of the corresponding item; receiving information indicating the orientation or movement of the touch screen device; and responsive to the received orientation or movement information, deforming the activation target of the item with respect to the representation of the item. Embodiments of the invention described provide the advantage of improved accuracy of selection of items when a touch screen device is operated at other than a normal operation and/or when moving.

In one embodiment, the items are a plurality of keys forming a virtual keyboard; and each of said representations are one of the plurality of keys on the display of the touch screen device. In these embodiments, typographical errors due to the touch screen device being operated at other than a normal orientation or when moving may be reduced.

In another embodiment, the step of deforming the activation target of an item is responsive to the detection of typographical errors.

In an embodiment, the information indicating the orientation or movement of the touch screen device originates from one or more of an accelerometer or a gyroscope. Typically, a touch screen device already incorporates an accelerometer or a gyroscope or both.

In one or more implementations, the deforming of the activation target of a key is carried out using a transformation matrix.

In certain embodiments, the deforming of the activation target of an item is responsive to which one of a plurality of different users is associated with the touch screen device.

In an embodiment, the deforming of the activation target of an item is responsive to different times of day.

Embodiments of the invention also provide an apparatus for deforming one or more touch screen activation targets associated with respective one or more representations of items displayed on a display of a touch screen device. The apparatus includes, for instance: means for displaying one or more representations corresponding to each of the one or more items displayed on a display of a touch screen device; means for providing, for each displayed representation, an activation target defining boundaries within which a touch input is processed as corresponding to selection of the corresponding item; means for receiving information indicating the orientation or movement of the touch screen device; and means, responsive to the received orientation or movement information, for deforming the activation target of the item with respect to the representation of the item.

Embodiments of the invention also provide a computer program product for deforming one or more touch screen activation targets associated with respective one or more representations of items displayed on a display of a touch screen device, the computer program product comprising: a computer readable storage medium having computer readable program code embodied therewith, the computer readable program code adapted to perform the method described above when the program is run on a computer.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the FIGS. illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the FIGS. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for deforming one or more touch screen activation targets associated with respective one or more representations of items displayed on a display of a touch screen device, the method comprising:
    displaying one or more representations corresponding to each of said one or more items displayed on a display of a touch screen device;
    providing, for each displayed representation, an activation target defining boundaries within which a touch input is processed as corresponding to selection of the corresponding item;
    automatically receiving information indicating a change in orientation or movement of the touch screen device;
    responsive to the received orientation or movement information, distorting a shape of the activation target of an item of the one or more items with respect to the representation of the item, without changing the displayed representation of the item, the distorting of the shape of the activation target resulting in pulling the shape from a first shape into a second, distorted shape based on the first shape of the activation target, and using at least one transformation matrix with one or more elements derived, at least in part, from the received orientation or movement information of the touch screen device to distort the shape of the activation target from the first shape to the second, distorted shape by applying the at least one transformation matrix to the first shape, thereby facilitating selection of the item via a touch input on the activation target; and
    wherein said distorting the shape of the activation target of the item is carried out by using a translate transformation matrix to move a center of the activation target, the translate matrix being used with one or more elements derived from the received orientation or movement information of the touch screen device, and using a scaling matrix transformation to distort the shape of the activation target.

2. The method of claim 1, wherein:
    said items are a plurality of keys forming a virtual keyboard; and
    each of said representations are one of said plurality of keys on the display of the touch screen device.

3. The method of claim 2, wherein said distorting the activation target of an item is responsive to the detection of typographical errors.

4. The method of claim 1, wherein said information indicating the orientation or movement of the touch screen device originates from one or more of an accelerometer or a gyroscope.

5. The method of claim 1, wherein said distorting the activation target of an item is responsive to which one of a plurality of different users is associated with the touch screen device.

6. The method of claim 1, wherein said distorting the activation target of an item is responsive to different times of day.

7. A system for deforming one or more touch screen activation targets associated with respective one or more representations of items displayed on a display of a touch screen device, the system comprising:
    a memory; and
    a processing device communicatively coupled to the memory, wherein the system performs a method comprising:

displaying one or more representations corresponding to each of said one or more displayed items on a display of a touch screen device;

providing, for each displayed representation, an activation target defining boundaries within which a touch input is processed as corresponding to selection of the corresponding item;

automatically receiving information indicating a change in orientation or movement of the touch screen device;

responsive to the received orientation or movement information, distorting a shape of the activation target of an item of the one or more items with respect to the representation of the item, without changing the displayed representation of the item, the distorting of the shape of the activation target resulting in pulling the shape from a first shape into a second, distorted shape based on the first shape of the activation target, and using at least one transformation matrix with one or more elements derived, at least in part, from the received orientation of movement information of the touch screen device to distort the shape of the activation target from the first shape to the second, distorted shape by applying the at least one transformation matrix to the first shape, thereby facilitating selection of the item via a touch input on the activation target; and wherein said distorting the shape of the activation target of the item is carried out by using a translate transformation matrix to move a center of the activation target, the translate matrix being used with one or more elements derived from the received orientation or movement information of the touch screen device, and using a scaling matrix transformation to distort the shape of the activation target.

8. The system of claim 7, wherein:

said items are a plurality of keys forming a virtual keyboard; and each of said representations are one of said plurality of keys on the display of the touch screen device.

9. The system of claim 8, wherein said distorting the activation target of an item is responsive to the detection of typographical errors.

10. The system of claim 7, wherein said information indicating the orientation or movement of the touch screen device originates from one or more of an accelerometer or a gyroscope.

11. The system of claim 7, wherein said distorting the activation target of an item is responsive to which one of a plurality of different users is associated with the touch screen device.

12. The system of claim 7, wherein said distorting the activation target of an item is responsive to different times of day.

13. A computer program product for deforming one or more touch screen activation targets associated with respective one or more representations of items displayed on a display of a touch screen device, the computer program product comprising:

a computer readable storage medium having computer readable program code embodied therewith, the computer readable program code adapted to performing the following when run on a computer:

displaying one or more representations corresponding to each of said one or more items displayed on a display of a touch screen device;

providing, for each displayed representation, an activation target defining boundaries within which a touch input is processed as corresponding to selection of the corresponding item;

automatically receiving information indicating a change in orientation or movement of the touch screen device;

responsive to the received orientation or movement information, distorting a shape of the activation target of an item of the one or more items with respect to the representation of the item, without changing the displayed representation of the item, the distorting of the shape of the activation target resulting in pulling the shape from a first shape into a second, distorted shape based on the first shape of the activation target, and using at least one transformation matrix with one or more elements derived, at least in part, from the received orientation or movement information of the touch screen device to distort the shape of the activation target from the first shape to the second, distorted shape by applying the at least one transformation matrix to the first shape, thereby facilitating selection of the item via a touch input on the activation target; and wherein said distorting the shape of the activation target of the item is carried out by using a translate transformation matrix to move a center of the activation target, the translate matrix being used with one or more elements derived from the received orientation or movement information of the touch screen device, and using a scaling matrix transformation to distort the shape of the activation target.

14. The computer program product of claim 13, wherein:

said items are a plurality of keys forming a virtual keyboard; and each of said representations are one of said plurality of keys on the display of the touch screen device.

15. The computer program product of claim 14, wherein said distorting the activation target of an item is responsive to the detection of typographical errors.

16. The computer program product of claim 13, wherein said information indicating the orientation or movement of the touch screen device originates from one or more of an accelerometer or a gyroscope.

17. The computer program product of claim 13, wherein said distorting the activation target of an item is responsive to which one of a plurality of different users is associated with the touch screen device.

* * * * *